US012510523B2

(12) United States Patent
Fujita et al.

(10) Patent No.: US 12,510,523 B2
(45) Date of Patent: Dec. 30, 2025

(54) FRAGRANCE INFORMATION PROCESSING SYSTEM, FRAGRANCE INFORMATION PROCESSING DEVICE, AND FRAGRANCE INFORMATION PROCESSING METHOD

(71) Applicant: SONY GROUP CORPORATION, Tokyo (JP)

(72) Inventors: Shuji Fujita, Tokyo (JP); Yukito Inoue, Tokyo (JP)

(73) Assignee: SONY GROUP CORPORATION, Tokto (JP)

( * ) Notice: Subject to any disclaimer, the term of this patent is extended or adjusted under 35 U.S.C. 154(b) by 455 days.

(21) Appl. No.: 18/001,733

(22) PCT Filed: May 19, 2021

(86) PCT No.: PCT/JP2021/018930
§ 371 (c)(1),
(2) Date: Dec. 14, 2022

(87) PCT Pub. No.: WO2021/261124
PCT Pub. Date: Dec. 30, 2021

(65) Prior Publication Data
US 2023/0221293 A1  Jul. 13, 2023

(30) Foreign Application Priority Data
Jun. 22, 2020  (JP) .................. 2020-107060

(51) Int. Cl.
*G01N 33/00* (2006.01)
(52) U.S. Cl.
CPC .............. *G01N 33/0004* (2013.01)

(58) Field of Classification Search
CPC ..... G01N 33/0004; G01N 33/00; G06Q 50/10
See application file for complete search history.

(56) References Cited

U.S. PATENT DOCUMENTS

2003/0172717 A1* 9/2003 Kita ............... G01N 33/0031
73/23.34
2012/0159364 A1* 6/2012 Hyun ............ G06F 3/04815
715/848
(Continued)

FOREIGN PATENT DOCUMENTS

JP  2001-305088 A  10/2001
JP  2008-537362 A   9/2008
(Continued)

OTHER PUBLICATIONS

International Search Report and Written Opinion of PCT Application No. PCT/JP2021/018930, issued on Jun. 22, 2021, 11 pages of ISRWO.

*Primary Examiner* — Alexander Satanovsky
(74) *Attorney, Agent, or Firm* — CHIP LAW GROUP

(57) ABSTRACT

Provided are a fragrance information processing system, a fragrance information processing device, and a fragrance information processing method for arranging pieces of information on fragrances using the similarity of the fragrances. The present technology provides a fragrance information processing system including a computer device that calculates a similarity between fragrances based on fragrance characteristic information indicating characteristics of the fragrances, the computer device including at least a calculation unit that arranges fragrance identification information for identifying the fragrances in an n-dimensional space with the fragrance characteristic information as an index using the similarity.

14 Claims, 19 Drawing Sheets

(56) References Cited

U.S. PATENT DOCUMENTS

2016/0216244 A1\* 7/2016 Sobel ................. G01N 33/0031
2018/0241927 A1\* 8/2018 Chen ...................... H04N 23/10

FOREIGN PATENT DOCUMENTS

| JP | 2021-076458 | A | 5/2021 | |
|----|----|----|----|----|
| KR | 20060047804 | \* | 5/2006 | ............ G06Q 50/10 |
| KR | 20190119743 | \* | 4/2018 | ........... H04N 21/466 |
| WO | 2001/089590 | A1 | 11/2001 | |
| WO | 2018/163361 | A1 | 9/2018 | |
| WO | 2018/211642 | A1 | 11/2018 | |

\* cited by examiner

Fig. 2

| FRAGRANCE IDENTIFICATION INFORMATION | FRAGRANCE CHARACTERISTIC INFORMATION ||||||||||||||
|---|---|---|---|---|---|---|---|---|---|---|---|---|---|---|
| | PHYSICOCHEMICAL ELEMENT |||||| BIOLOGICAL ELEMENT || LINGUISTIC AND PSYCHOLOGICAL ELEMENT ||||||
| | MOLECULAR WEIGHT | MOLECULAR FUNCTIONAL GROUP | MOLECULAR SHAPE | MOLECULAR VIBRATION | PERSISTENCE | INTENSITY | RECEPTOR BINDING | EFFECT/ EFFICACY | CATEGORY | IMAGE COLOR | ADJECTIVE LABEL | CULTURE/ REGION LABEL | SEASON LABEL | ERA LABEL |
| A | *** | *** | *** | *** | *** | *** | *** | *** | *** | *** | *** | *** | *** | *** |
| B | *** | *** | *** | *** | *** | *** | *** | *** | *** | *** | *** | *** | *** | *** |
| C | *** | *** | *** | *** | *** | *** | *** | *** | *** | *** | *** | *** | *** | *** |
| : | : | : | : | : | : | : | : | : | : | : | : | : | : | : |

FRAGRANCE INFORMATION PROCESSING SYSTEM, FRAGRANCE INFORMATION PROCESSING DEVICE, AND FRAGRANCE INFORMATION PROCESSING METHOD

CROSS REFERENCE TO RELATED APPLICATIONS

This application is a U.S. National Phase of International Patent Application No. PCT/JP2021/018930 filed on May 19, 2021, which claims priority benefit of Japanese Patent Application No. JP 2020-107060 filed in the Japan Patent Office on Jun. 22, 2020. Each of the above-referenced applications is hereby incorporated herein by reference in its entirety.

TECHNICAL FIELD

The present technology relates to a fragrance information processing system, a fragrance information processing device, and a fragrance information processing method.

BACKGROUND ART

Conventionally, a technology of stimulating a user's senses using a scent generating device has been used. In particular, a technology is used in which a computer device and a scent generating device work together to stimulate the user's sense of smell.

For example, PTL 1 discloses "an odor generating device that generates a desired odor under the control of a computer, the device including a plurality of fragrance storage members, a scent information registering unit that registers preset scent information relating to an odor classification table, the type of fragrance set in advance corresponding to an odor item in the odor classification table, the amount of generation, and the amount of change over time in the amount of generation, a scent information selection and extraction unit that selects a predetermined odor item from the odor classification table and extracts the set scent information corresponding to the predetermined odor item, an odor generation control unit that controls generation of odor based on an odor generation program and the scent information, an odor selection unit that selects a specific fragrance storage member from the fragrance storage members by the control of the odor generation control unit, an odor generating unit that generates an odor from the specific fragrance storage member based on the odor selection unit, an odor generation program storage unit that stores the odor generation program, and an image display unit".

CITATION LIST

Patent Literature

[PTL 1]
 WO 01/89590

SUMMARY

Technical Problem

However, there is a problem that, when a user selects fragrances to generate a desired scent, it is difficult for the user to recognize the similarity between fragrances.

Therefore, a main object of the present technology is to provide a fragrance information processing system, a fragrance information processing device, and a fragrance information processing method that arrange pieces of information on fragrances using the similarity of fragrances.

Solution to Problem

The present technology provides a fragrance information processing system including: a computer device that calculates a similarity between fragrances based on fragrance characteristic information indicating characteristics of the fragrances, the computer device including at least a calculation unit that arranges fragrance identification information for identifying the fragrances in an n-dimensional space with the fragrance characteristic information as an index using the similarity.

The similarity may include a distance in the n-dimensional space.

The similarity may include a correlation in the n-dimensional space.

The calculation unit may select the fragrance characteristic information recommended according to the similarity.

The calculation unit may select the fragrance identification information recommended according to the similarity.

The calculation unit may arrange the fragrance identification information in an n-dimensional space with the fragrance characteristic information as an index using operation history information.

The fragrance information processing system may further include an operation interface unit that displays icons associated with the fragrance identification information, and the operation interface unit may arrange and display the icons in an n-dimensional space with the fragrance characteristic information as an index.

The operation interface unit may prompt a user to select the fragrance characteristic information.

The operation interface unit may prompt a user to select a plurality of pieces of the fragrance characteristic information.

The operation interface unit may prompt a user to specify a priority of a plurality of pieces of the fragrance characteristic information, and the calculation unit may weight each of the plurality of pieces of fragrance characteristic information according to the priority.

The operation interface unit may change the arrangement of the icons over time.

The operation interface unit may change the arrangement of the icons according to the user's situation.

The fragrance information processing system may further include an information acquisition unit, and the information acquisition unit may acquire fragrance information from a fragrance holder that holds the fragrance.

The fragrance information processing system may further include a scent generating unit, and the scent generating unit may generate a scent corresponding to the fragrance identification information selected by the user.

The present technology also provides a fragrance information processing device including at least a calculation unit that arranges fragrance identification information for identifying fragrances in an n-dimensional space with fragrance characteristic information indicating characteristics of the fragrances as an index using a similarity between the fragrances based on the fragrance characteristic information.

The present technology also provides a fragrance information processing method including at least allowing a computer device to arrange fragrance identification information for identifying fragrances in an n-dimensional space with fragrance characteristic information indicating characteristics of the fragrances as an index using a similarity between the fragrances based on the fragrance characteristic information.

BRIEF DESCRIPTION OF DRAWINGS

FIG. 2 is an example of a database held by a storage unit 22 according to an embodiment of the present technology.

DESCRIPTION OF EMBODIMENTS

Figure 1:
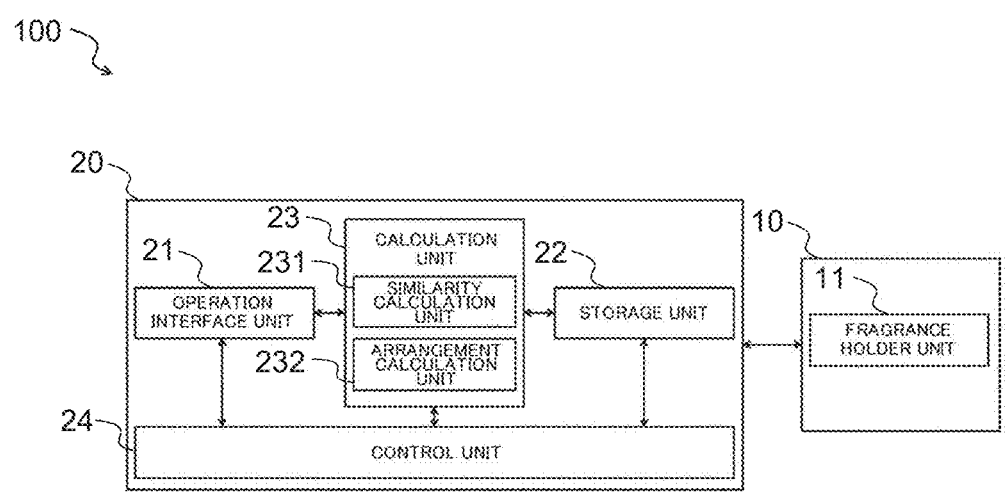
FIG. 1 is a block diagram showing the configuration of a fragrance information processing system 100 according to an embodiment of the present technology.

Hereinafter, suitable embodiments for implementing the present technology will be described. The embodiments which will be described below show an example of a representative embodiment of the present technology, and the scope of the present technology should not be narrowly interpreted on the basis of this. Each figure is a schematic diagram and is not necessarily strictly illustrated.

The present technology will be described in the following order.

1. First embodiment of present technology (example 1 of fragrance information processing system)
   (1) Outline of present embodiment
   (2) Storage unit
   (3) Similarity calculation unit
   (4) Arrangement calculation unit
   (5) Operation interface unit
   (6) Flowchart
   (7) Hardware configuration
2. Second embodiment of present technology (example 2 of fragrance information processing system)
3. Third embodiment of present technology (example 3 of fragrance information processing system)
4. Fourth embodiment of present technology (example 4 of fragrance information processing system)
5. Fifth embodiment of present technology (example 5 of fragrance information processing system)
6. Sixth embodiment of present technology (example 6 of fragrance information processing system)
7. Seventh embodiment of present technology (example 7 of fragrance information processing system)
8. Eighth embodiment of present technology (fragrance information processing device)
9. Ninth embodiment of present technology (fragrance information processing method)

1. First Embodiment of Present Technology
(Example 1 of Fragrance Information Processing System)

[(1) Outline of Present Embodiment]

The present technology is a technology in which a computer device and a scent generating device cooperate to stimulate a user's sense of smell. A fragrance information processing device included in a fragrance information processing system according to an embodiment of the present technology is a computer device and prompts a user to select a fragrance. Then, the fragrance information processing device outputs information on the selected fragrance to the scent generating device. In this way, the scent generating device can generate the scent desired by the user.

There are about 600 natural fragrances and about 3,000 synthetic fragrances. A specific fragrance is selected from among them and held in a fragrance holder (cartridge) or the like provided in the scent generating device.

However, when a user selects a fragrance to produce a desired scent, the user may not be able to image what kind of scent the fragrance will generate based on only the name of the fragrance. Therefore, there is a problem that it is difficult for the user to recognize the similarity between fragrances. In particular, this difficulty becomes significant when a customized fragrance made up of a plurality of fragrances is held in the fragrance holder.

In addition, when the scent generating device includes one or more fragrance holders, it is difficult for the user to recognize which fragrance holder holds the desired fragrance among the plurality of fragrance holders.

A fragrance information processing device according to an embodiment of the present technology displays icons associated with fragrances held in a fragrance holder, for example, on an operation interface unit such as a display screen. The fragrance information processing can contribute to the improvement of convenience by arranging icons related to similar fragrances close to each other.

According to the present technology, the user can easily select a desired fragrance. Since similar fragrances are arranged close to each other, the user can easily image the fragrance.

According to the present technology, the user can select a desired fragrance without being aware of the arrangement order of the fragrance holders. The user does not have to arrange the fragrance holders in order of similarity of scent.

Note that these effects are the same in other embodiments described later. Therefore, repetitive descriptions will be omitted in other embodiments to be described later.

A configuration of a fragrance information processing system according to an embodiment of the present technology will be described with reference to FIG. 1.

FIG. 1 is a block diagram showing the configuration of a fragrance information processing system 100 according to an embodiment of the present technology. As shown in FIG. 1, the fragrance information processing system 100 according to an embodiment of the present technology includes a scent generating device 10 and a fragrance information processing device 20.

The scent generating device 10 and the fragrance information processing device 20 are connected to each other. The scent generating device 10 and the fragrance information processing device 20 may be connected via an information processing network (not shown) or the like, or may be connected via a cable or the like.

The scent generating device 10 can include one or more fragrance holders 11 that hold fragrances. The scent generating device 10 can generate a scent by vaporizing the fragrance held in the fragrance holder 11. For example, the scent generating device 10 can vaporize a liquid fragrance or a wet fragrance to emit the scent with air supplied by an exhaust fan (not shown).

The fragrance information processing device 20 can include, for example, an operation interface unit 21, a storage unit 22, a calculation unit 23, and a control unit 24.

The operation interface unit 21 prompts the user to operate the fragrance information processing device. The operation interface unit 21 can be realized by using, for example, a touch panel. The operation interface unit 21 can acquire information on the user's operation by recognizing the user's touch operation.

The operation interface unit 21 can present a plurality of icons associated with fragrances to the user and prompt the user to select an icon associated with a desired fragrance from among the plurality of icons.

The storage unit 22 holds information on fragrances. A detailed description of the storage unit 22 will be given later.

Using the similarity between fragrances based on the fragrance characteristic information, the calculation unit 23 arranges the fragrance identification information in an n-dimensional space with the fragrance characteristic information as an index. Note that n is an integer of 1 or more.

The calculation unit 23 can include a similarity calculation unit 231 that calculates the similarity between fragrances, and an arrangement calculation unit 232 that uses the similarity to arrange the fragrance identification information in an n-dimensional space with the fragrance characteristic information as an index.

The control unit 24 controls the operations of the operation interface unit 21, the storage unit 22 and the calculation unit 23.

[(2) Storage Unit]

Information held by the storage unit 22 will be described with reference to FIG. 2. FIG. 2 is an example of a database held by the storage unit 22 according to the present embodiment.

As shown in FIG. 2, this database includes, for example, fragrance identification information for identifying fragrances, fragrance characteristic information indicating characteristics of fragrances, and the like.

The fragrance characteristic information may include information on physicochemical, biological, linguistic and psychological elements of fragrances which are compounds. It should be noted that the fragrance characteristic information may include information on some of these elements.

Information on physicochemical elements may include, for example, information on a molecular weight, molecular functional groups, a molecular shape, molecular vibrations, persistence, and/or intensity.

Information on the molecular weight includes information on the amount of molecules contained in fragrances.

Information on functional groups includes information on functional groups possessed by molecules contained in fragrances.

Information on the molecular shape includes information on the skeleton of molecules contained in fragrances, such as hydrocarbons, aromatic hydrocarbons, and heterocyclic aromatic hydrocarbons. Alternatively, information on the molecular shape may include information on structural isomers, stereoisomers, and the like.

The information on molecular vibrations includes information on vibrational levels of molecules contained in fragrances, such as symmetric stretching vibrations, bending vibrations, and asymmetric stretching vibrations.

Information on persistence includes information on the degree to which the fragrance lasts. Fragrances can be classified into, for example, top notes with a low degree of persistence, base notes with a high degree of persistence, and middle notes with an intermediate degree of persistence between the top notes and the base notes.

The information on intensity includes information on intensity of scent. Information on intensity may include information on fragrance concentration, but the relationship between concentration and intensity is not uniform. For example, thiols are known to have high intensity even at low concentrations.

Information on biological elements may include, for example, information on receptor binding, effect/efficacy, and the like.

Information on receptor binding includes information on binding between scents and olfactory receptors (receptors). By binding scents to these olfactory receptors, emotions such as likes and dislikes caused by scents and behaviors such as attraction and avoidance are converted into data.

The information on effect/efficacy includes information on the effect or efficacy when inhaling the scent. Information on effect/efficacy includes, for example, information on sedative action, stimulant action, and the like.

Next, information on linguistic and psychological elements may include, for example, information on categories, image colors, adjective labels, culture/region labels, season labels, era labels, and the like.

The category information includes information on the category to which the scent belongs, such as floral, herbal, woody, fruity, rotten, smoky, and soapy smells.

The information on image colors includes information on the color imaged in association with the scent. For example, the color image in association with the scent of lavender may be purple.

The information on the descriptive label includes information on the label descriptive of fragrance such as refreshing, gorgeous, spicy, and musty smells.

The information on the culture/region label includes information on the culture or region imaged in association with the scent. For example, the region imaged associated with the scent of sandalwood may be Asia. For example, the region imaged in association with the scent of tatami mats may be Japan.

The information on the season label includes information on the season imaged in association with the scent. For example, the season associated with the scent of cherry blossoms may be spring. For example, the season imaged in association with the scent of cinnamon may be winter.

The information on the era label includes information on the era imaged in association with the scent. For example, the era imaged in association with the scent of oil stoves and insect repellents may be the Showa era.

In constructing this database, for example, an aroma wheel or the like can be used. An aroma wheel is a circular and layered array of characteristics such as scents, taking similarities and specialties into consideration. Aroma wheels are mainly used to have a common understanding of scents and tastes. In the aroma wheel, scents with similar characteristics tend to be arranged close to each other, so they can be used to calculate the similarity.

[(3) Similarity Calculation Unit]

The similarity calculation unit 231 refers to the information on fragrances held in the storage unit 22, and calculates the similarity between fragrances based on the fragrance characteristic information.

The means for calculating the similarity is not particularly limited, and a conventional cluster analysis method may be used. For example, the similarity calculation unit 231 can derive the similarity by calculating the distance in the n-dimensional space. The closer the distance, the higher the similarity.

The similarity calculation unit 231 may calculate the Euclidean distance, standard Euclidean distance, Mahalanobis distance, Chebyshev distance, Minkowski distance, and the like as examples of the distance.

For example, when a database is constructed using an aroma wheel, since scents with similar characteristics tend to be arranged close to each other in the aroma wheel, the closeness of the distance between items in the database can be used to calculate the similarity. When there is one piece of fragrance characteristic information based on similarity calculation, the similarity includes the distance in one-dimensional space. When there are n pieces of fragrance characteristic information based on similarity calculation, the similarity includes distance in the n-dimensional space.

Alternatively, the similarity may include correlation in the n-dimensional space. For example, the similarity calculation unit 231 can calculate a cosine similarity using, as an index, the closeness of the directions of vectors in the n-dimensional space. The closer the directions of the vectors included in the fragrance information in the n-dimensional space, the higher the similarity calculated by the similarity calculation unit 231. In addition, the similarity calculation unit 231 may calculate a Pearson's correlation coefficient, a deviation pattern similarity, and the like as examples of the correlation.

Alternatively, the similarity may be calculated by combining the distance and the correlation.

In addition, the similarity calculation unit 231 can perform various cluster analyses, such as, for example, k-means and multidimensional scaling (MDS).

The fragrance characteristic information used for the similarity calculation can be selected by the user via the operation interface unit 21. In this way, the similarity is calculated based on the fragrance characteristic information desired by the user. A detailed description of the operation interface unit 21 will be given later.

[(4) Arrangement Calculation Unit]

Figure 3:
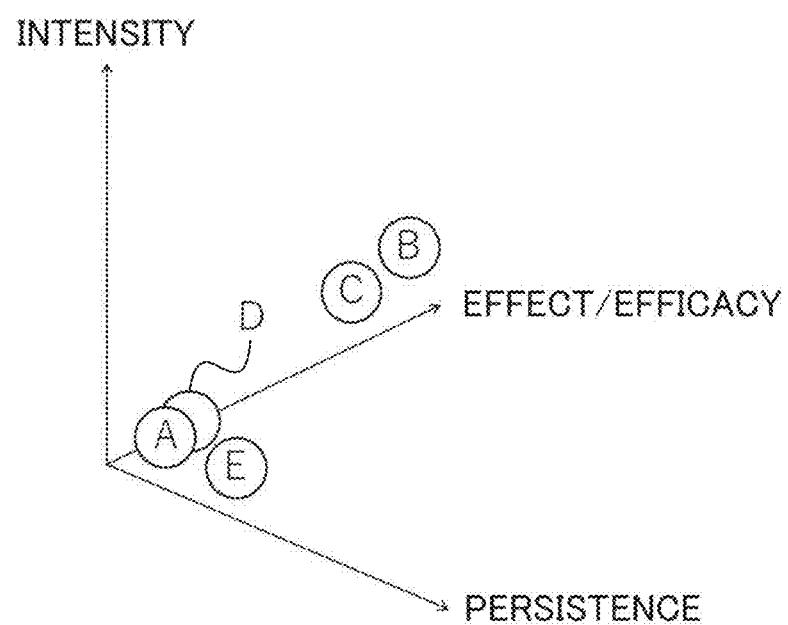
FIG. 3 is a diagram showing an example of an n-dimensional space computed by an arrangement calculation unit 232 according to an embodiment of the present technology.

The arrangement calculation unit 232 uses the similarity calculated by the similarity calculation unit 231 to arrange the fragrance identification information in an n-dimensional space with the fragrance characteristic information as an index. This will be described with reference to FIG. 3. FIG. 3 is a diagram showing an example of an n-dimensional space calculated by the arrangement calculation unit 232 according to the present embodiment.

As shown in FIG. 3, a three-dimensional space with intensity, persistence, and effect/efficacy as indices is shown as an example of the fragrance characteristic information. A plurality of pieces of fragrance identification information are arranged in this three-dimensional space. For example, focusing on the axis with persistence as an index, since the similarity between fragrance A, fragrance D, and fragrance E is high, the fragrance identification information on fragrance A, the fragrance identification information on fragrance D, and the fragrance identification information on fragrance E are arranged in the vicinity.

In addition, since the fragrance A and the fragrance D are very similar, the fragrance identification information on the fragrance A and the fragrance identification information on the fragrance D overlap each other, and the difference is indistinct. At this time, the arrangement calculation unit 232 may rearrange the fragrance identification information in a four-dimensional space to which a new index is added, for example. In this way, the difference between fragrance A and fragrance D becomes clear.

This will be explained using specific example data. Assume that the similarity calculation unit 231 calculates a value of 1 for fragrance A, a value of 310 for fragrance B, a value of 240 for fragrance C, a value of 28 for fragrance D, and a value of 3 for fragrance E.

The arrangement calculation unit 232 calculates arrangement information using these values. This arrangement information can be represented by coordinates, for example. The arrangement calculation unit 232 may calculate the arrangement information according to the closeness of these values, for example.

When the fragrance identification information is arranged in a one-dimensional space, the arrangement calculation unit 232 calculates a coordinate (1) for the value of fragrance A, a coordinate (5) for the value of fragrance B, a coordinate (4) for the value of fragrance C, a coordinate (3) for the value of fragrance D, and a coordinate (2) for the value of fragrance E. That is, the arrangement calculation unit 232 rearranges the fragrance identification information in ascending order of the values calculated by the similarity calculation unit 231. As a result, the fragrance identification information is arranged in the order of fragrance A, fragrance E, fragrance D, fragrance C, and fragrance B in a one-dimensional space.

Similarly, when the fragrance identification information is arranged in a two-dimensional space, the value of the fragrance A may be indicated, for example, as coordinates (1,1) by the calculation of the arrangement calculation unit 232. When the fragrance identification information is arranged in a three-dimensional space, the value of the fragrance A may be indicated, for example, as coordinates (1,1,1) by the calculation of the arrangement calculation unit 232.

By the way, the arrangement calculation unit 232 may use the user's operation history information in addition to the similarity to arrange the fragrance identification information in an n-dimensional space using the fragrance characteristic information as an index.

The operation history information can include, for example, the number of times selected by the user. The arrangement calculation unit 232 may arrange pieces of fragrance identification information having similar numbers of times close to each other.

Alternatively, the operation history information can include, for example, a prior probability distribution in Bayesian estimation. Specifically, the probabilities that fragrances B, C, and D will be selected after fragrance A is selected are 0.6, 0.1, and 0.3, respectively, the arrangement calculation unit 232 can arrange the pieces of fragrance identification information in the order of fragrance A, fragrance B, fragrance D, and fragrance C.

In this way, the fragrance identification information is arranged according to the user's operation, and the convenience of the fragrance information processing device 20 is improved.

This n-dimensional space may be the space before presented to the user or the space presented to the user. In the latter case, the arrangement calculation unit 232 may transform this n-dimensional space into a lower-dimensional space. For example, when intensity is selected by the user as fragrance characteristic information, the arrangement calculation unit 232 may transform the three-dimensional space shown in FIG. 3 into a one-dimensional space with intensity as an index. For this transformation, for example, principal component analysis can be used.

[(5) Operation Interface Unit]

Figure 4:
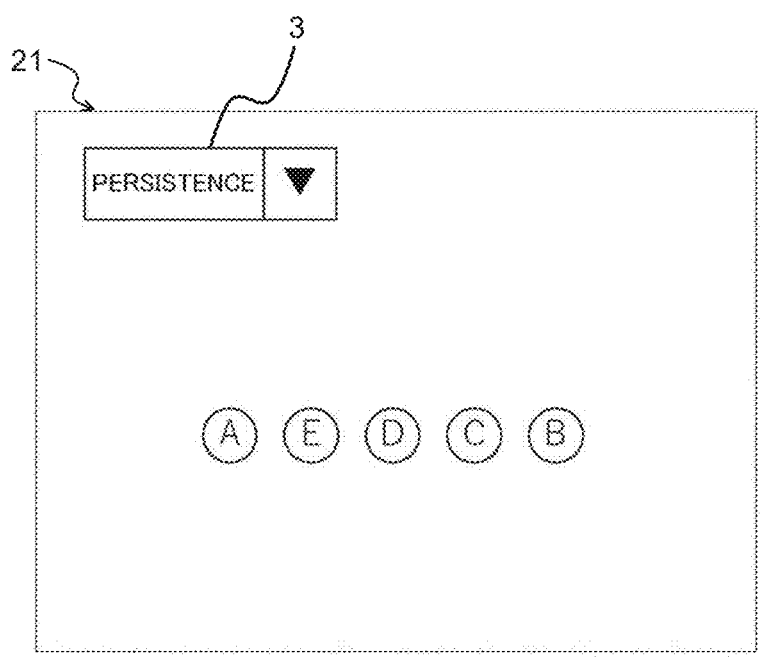
FIG. 4 is a diagram showing an example of a screen displayed on an operation interface unit 21 according to an embodiment of the present technology.

The operation interface unit 21 will be described with reference to FIG. 4. FIG. 4 is a diagram showing an example of a screen displayed on the operation interface unit 21 according to the present embodiment.

As shown in FIG. 4, the operation interface unit 21 arranges and displays icons in an n-dimensional space with fragrance characteristic information as an index. This icon is associated with the fragrance identification information arranged by the arrangement calculation unit 232. In the present embodiment, the operation interface unit 21 arranges and displays icons A to E in a one-dimensional space with persistence as an index.

That is, the operation interface unit 21 updates and displays the fragrance identification information arranged in the n-dimensional space by the arrangement calculation unit 232 according to the fragrance characteristic information. For example, when the fragrance characteristic information selected via the operation interface unit 21 is one type of persistence, the operation interface unit 21 updates and displays the fragrance identification information arranged in the three-dimensional space by the arrangement calculation unit 232 into a one-dimensional space with persistence as an index.

The operation interface unit 21 can prompt the user to select fragrance characteristic information. In this example, a list box 3 prompts the user to select fragrance characteristic information. For example, a user who attaches importance to persistence of scent can select persistence as the fragrance characteristic information via the list box 3. The similarity calculation unit 231 can calculate the similarity between fragrances based on persistence.

Figure 5:
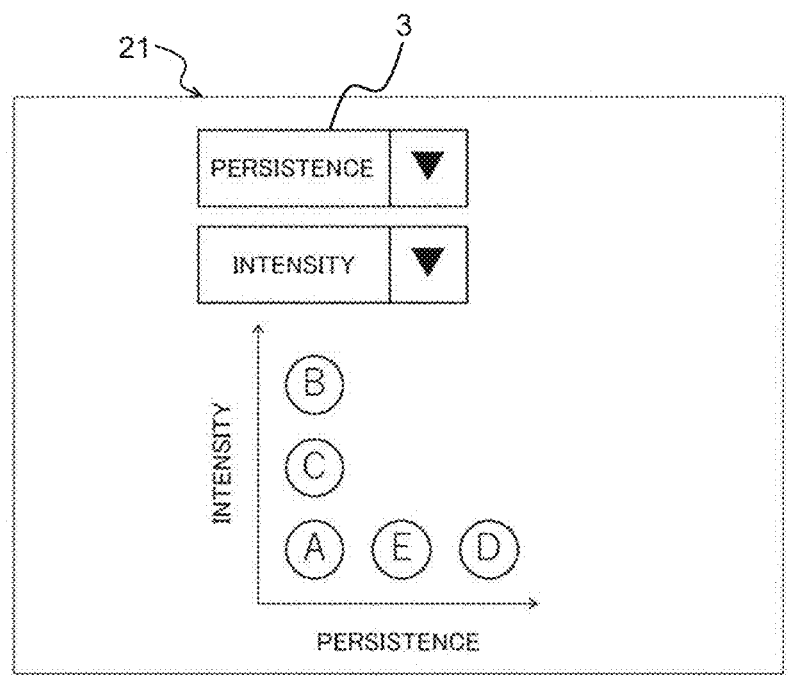
FIG. 5 is a diagram showing an example of a screen displayed on the operation interface unit 21 according to an embodiment of the present technology.

The operation interface unit 21 may prompt the user to select a plurality of pieces of fragrance characteristic information. This will be described with reference to FIG. 5. FIG. 5 is a diagram showing an example of a screen displayed on the operation interface unit 21 according to the present embodiment.

As shown in FIG. 5, the operation interface unit 21 has a plurality of list boxes 3. Each of the plurality of list boxes 3 prompts the user to select fragrance characteristic information. In the present embodiment, the user has selected persistence and intensity from among a plurality of pieces of fragrance characteristic information. The operation interface unit 21 arranges icons A to E in a two-dimensional space with persistence and intensity as indices. Note that the number of list boxes 3 is not particularly limited.

In addition, when prompting the user to select a plurality of pieces of fragrance characteristic information, the plurality of pieces of fragrance characteristic information may have mutually contradictory characteristics. In this way, the user can intentionally mask scents.

Figure 6:
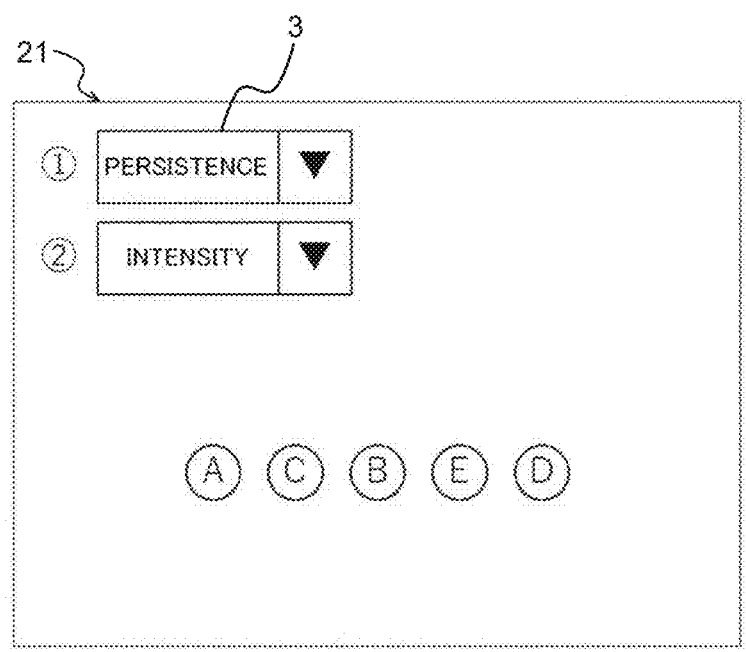
FIG. 6 is a diagram showing an example of a screen displayed on the operation interface unit 21 according to an embodiment of the present technology.

The operation interface unit 21 may prompt the user to specify the priorities of a plurality of pieces of fragrance characteristic information. This will be described with reference to FIG. 6. FIG. 6 is a diagram showing an example of a screen displayed on the operation interface unit 21 according to the present embodiment.

As shown in FIG. 6, the operation interface unit 21 has a plurality of list boxes 3. Each of the plurality of list boxes 3 indicates a priority. In the present embodiment, the user has selected persistence as the highest priority fragrance characteristic information, and intensity as the next highest priority fragrance characteristic information.

At this time, the similarity calculation unit 231 can weight each of the plurality of pieces of fragrance characteristic information according to the priority. The similarity calculation unit 231 can calculate the similarity between fragrances and multiply the similarity by a coefficient. In this way, the operation interface unit 21 arranges and displays the icons based on the similarity and the priority.

One icon may be associated with a plurality of pieces of fragrance identification information. In this way, when one icon is selected, a plurality of pieces of fragrance identification information are selected. As a result, a plurality of fragrances are automatically blended. As a result, it becomes easier to blend the fragrances for obtaining a desired scent.

Figure 7:
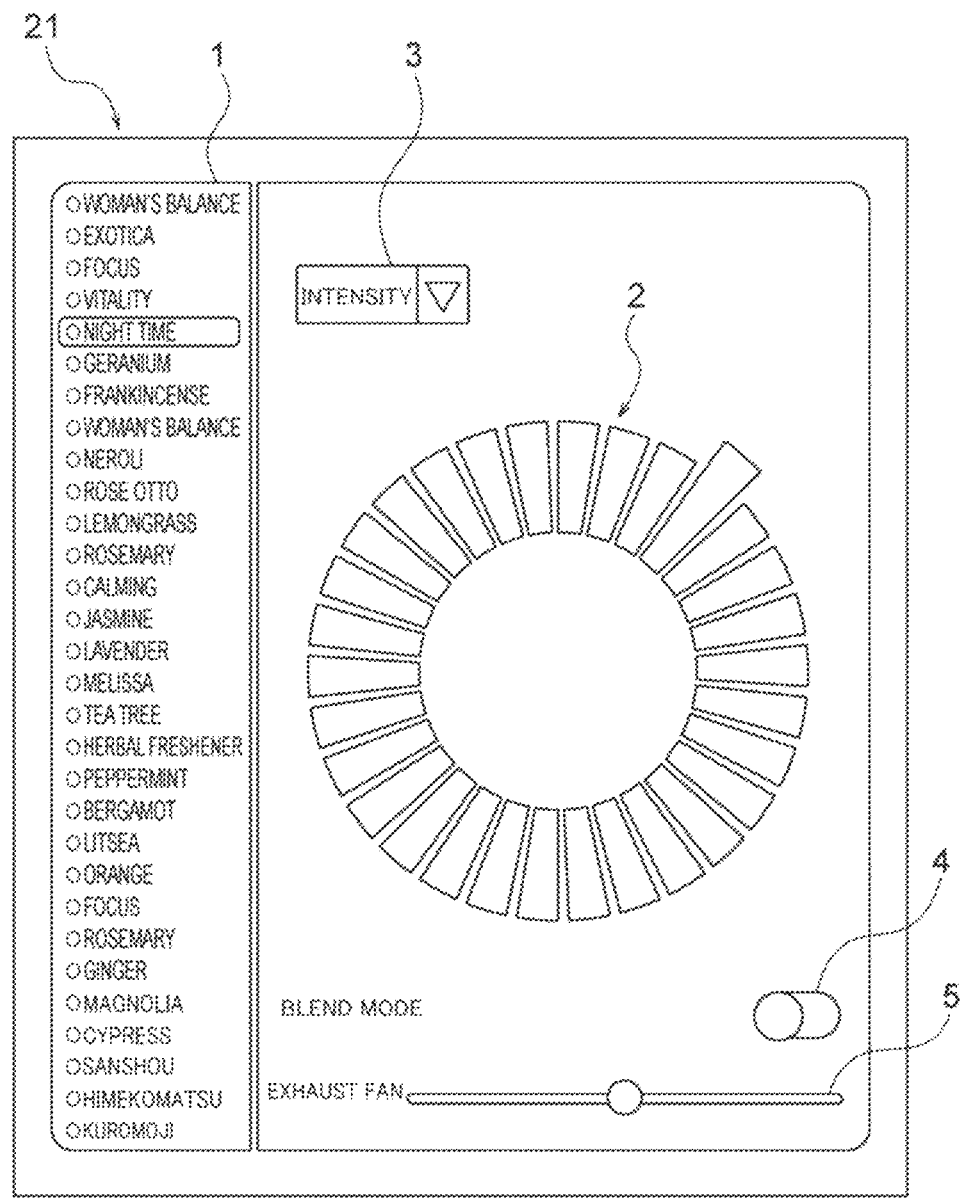
FIG. 7 is a diagram showing an example of a screen displayed on the operation interface unit 21 according to an embodiment of the present technology.

Another embodiment of the operation interface unit 21 will be described with reference to FIG. 7. FIG. 7 is a diagram showing an example of a screen displayed on the operation interface unit 21 according to the present embodiment.

As shown in FIG. 7, the operation interface unit 21 arranges and displays a plurality of icons in a circular shape in a one-dimensional space with the fragrance characteristic information as an index. The plurality of icons may be arranged at equal intervals, or may not be arranged at equal intervals.

List 1 on the left side has a plurality of pieces of fragrance identification information arranged side by side. Each of the plurality of pieces of fragrance identification information and each of the plurality of icons 2 are associated. In this way, the user can recognize the name of the fragrance associated with the icon 2.

When the user selects a desired icon 2, the size of the icon 2 is changed and the icon 2 is highlighted. At the same time, the fragrance identification information associated with the selected icon 2 is highlighted in the list 1 by being marked.

The operation interface unit 21 may display a list box 3 for prompting the user to select fragrance characteristic information. When the user selects, for example, intensity, the icons 2 are rearranged according to the intensity similarity.

Furthermore, the operation interface unit 21 may display a meter 5 associated with the intensity of the exhaust fan that emits a scent. In this way, the user can adjust the intensity of the exhaust fan by adjusting the position of the meter 5.

Figure 8:
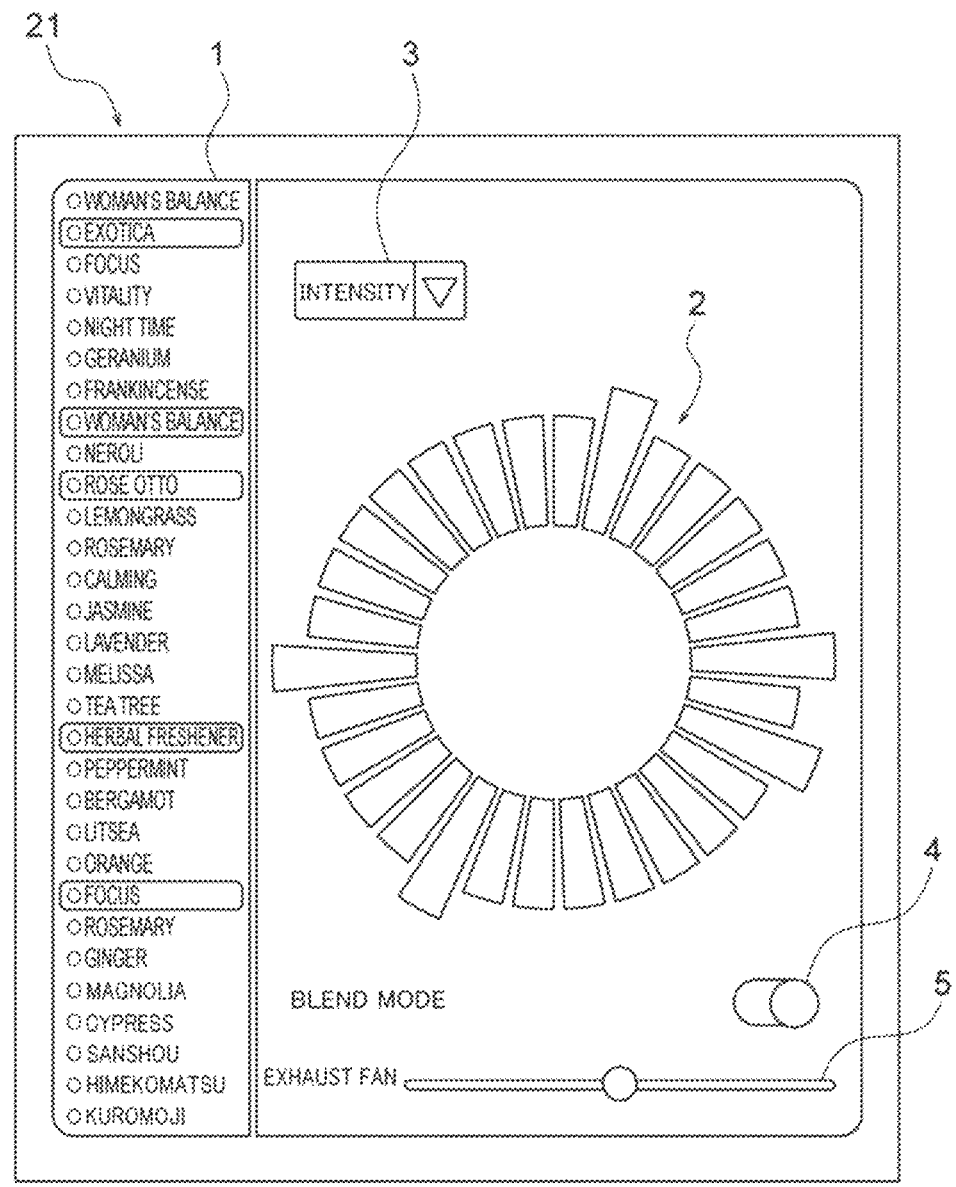
FIG. 8 is a diagram showing an example of a screen displayed on the operation interface unit 21 according to an embodiment of the present technology.

Furthermore, the operation interface unit 21 may display a switch 4 for switching a blend mode, which is a mode for blending a plurality of fragrances. An embodiment of the operation interface unit 21 in the blend mode, that is, when the switch 4 is on, will be described with reference to FIG. 8. FIG. 8 is a diagram showing an example of a screen displayed on the operation interface unit 21 according to the present embodiment.

As shown in FIG. 8, when the switch 4 is on, a plurality of icons can be selected. The selected icons are highlighted.

[(6) Flowchart]

Figure 9:
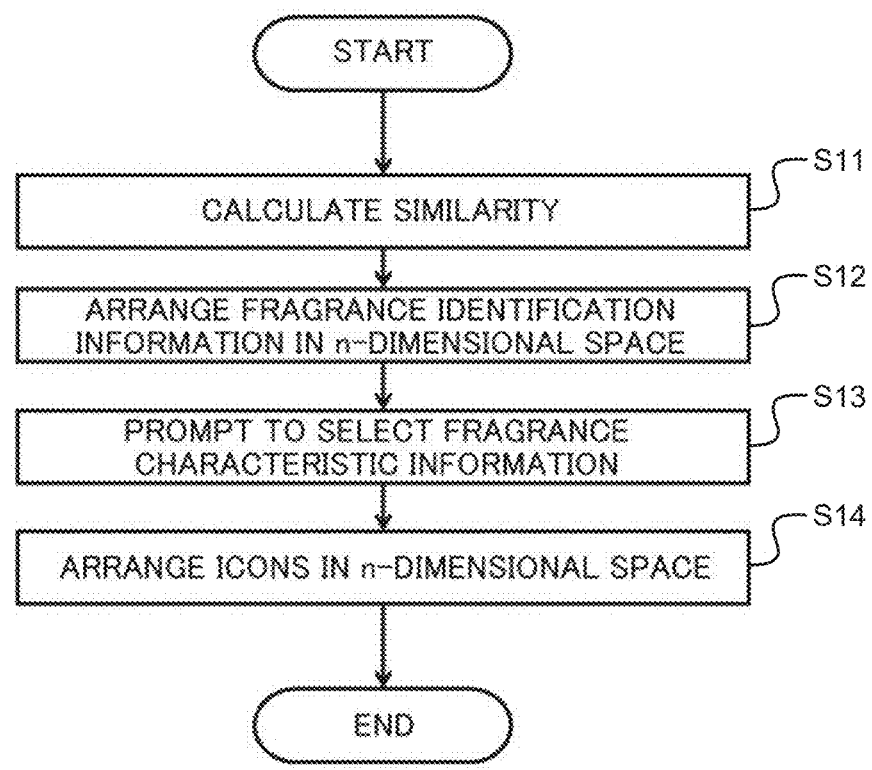
FIG. 9 is a flowchart showing an example of the procedure of the fragrance information processing system 100 according to an embodiment of the present technology.

The processing flow of the fragrance information processing system 100 will be described with reference to FIG. 9. FIG. 9 is a flowchart showing an example of the procedure of the fragrance information processing system 100 according to an embodiment of the present technology.

As shown in FIG. 9, first, in step S11, the similarity calculation unit 231 refers to the information on fragrances held in the storage unit 22, and calculates the similarity between fragrances based on the fragrance characteristic information.

Next, in step S12, the arrangement calculation unit 232 uses the similarity calculated by the similarity calculation unit 231 to arrange the fragrance identification information in an n-dimensional space with the fragrance characteristic information as an index.

Next, in step S13, the operation interface unit 21 prompts the user to select fragrance characteristic information.

Finally, in step S14, the operation interface unit 21 arranges and displays icons in an n-dimensional space with the selected fragrance characteristic information as an index.

[(7) Hardware Configuration]

Figure 10:
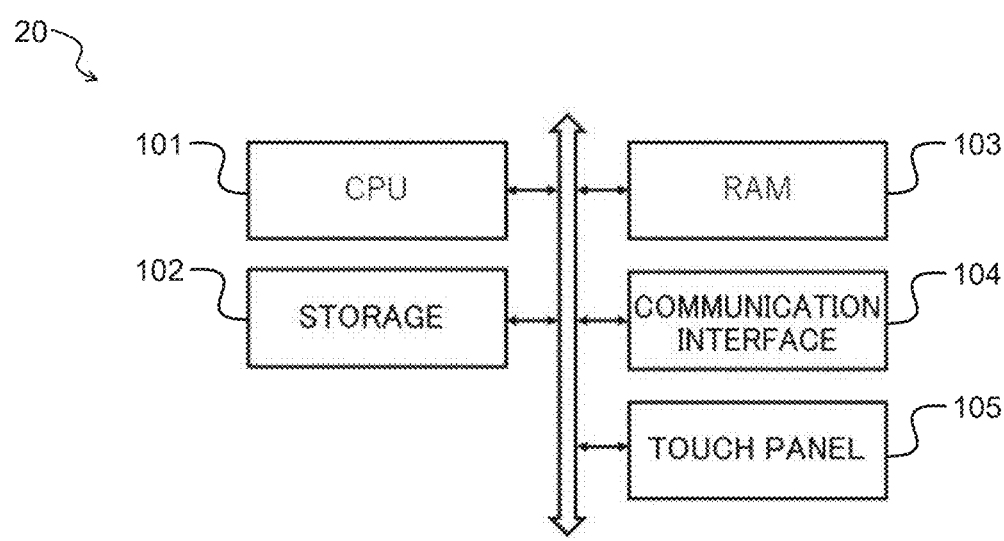
FIG. 10 is a block diagram showing the hardware configuration of the fragrance information processing device 20 according to an embodiment of the present technology.

The hardware configuration of the fragrance information processing device 20 will be described with reference to FIG. 10. FIG. 10 is a block diagram showing the hardware configuration of the fragrance information processing device 20 according to an embodiment of the present technology. As shown in FIG. 10, the fragrance information processing device 20 can include a CPU 101, a storage 102, a RAM (Random Access Memory) 103, a communication interface 104, and a touch panel 105 as components. The respective components are connected by a bus as a data transmission line, for example.

The CPU 101 is realized by, for example, a microcomputer, and controls each component of the fragrance information processing device 20. The CPU 101 can function as, for example, the control unit 24 and the calculation unit 23. The calculation unit 23 can be realized by using a program, for example. The CPU 101 functions by reading this program.

The storage 102 stores programs used by the CPU 101 and control data such as calculation parameters. The storage 102 can be realized by using, for example, an HDD (Hard Disk Drive) or an SSD (Solid State Drive). The storage 102 can function as the storage unit 12, for example.

The RAM 103 temporarily stores programs and the like executed by the CPU 101, for example.

The communication interface 104 has a function of communicating via an information communication network 50 using communication technologies such as, for example, Wi-Fi, Bluetooth (registered trademark), and LTE (Long Term Evolution).

The touch panel 105 prompts the user to perform operations by touch operations. The touch panel 105 can function as the operation interface unit 21, for example.

The fragrance information processing device 20 may be, for example, a smartphone terminal, and may be a tablet terminal, a mobile phone terminal, a PDA (Personal Digital Assistant), a PC (Personal Computer), a portable music player, a portable game machine, or a wearable terminal (HMD: Head Mounted Display, glasses-type HMD, watch-type terminal, band-type terminal, or the like).

A program that implements the calculation unit 23 and the like may be stored in a computer device or computer system other than the fragrance information processing system 100. In this case, the fragrance information processing system 100 can use a cloud service that provides the functions of this program. Examples of cloud services include SaaS (Software as a Service), IaaS (Infrastructure as a Service), PaaS (Platform as a Service), and the like.

The program can be stored and supplied to the computer using various types of non-transitory computer readable media. Non-transitory computer-readable media include various types of tangible storage media. Examples of non-transitory computer-readable media include magnetic recording media (for example, floppy disks, magnetic tapes and hard disk drives), magneto-optical recording media (for example, magneto-optical discs), Compact Disc Read Only Memory (CD-ROM), CD-R, CD-R/W, and semiconductor memory (for example, Mask ROM, Programmable ROM (PROM), Erasable PROM (EPROM), Flash ROM, and Random Access Memory (RAM)). The program may also be supplied to the computer by various types of transitory computer readable medium. Examples of transitory computer-readable media include electrical signals, optical signals, and electromagnetic waves. Transitory computer-readable media can deliver the program to the computer via wired communication channels, such as electrical wires and optical fibers, or wireless communication channels.

Note that the technology used in the present embodiment can also be used in other embodiments described later. The same applies to other embodiments.

2. Second Embodiment of Present Technology
(Example 2 of Fragrance Information Processing System)

Figure 11:
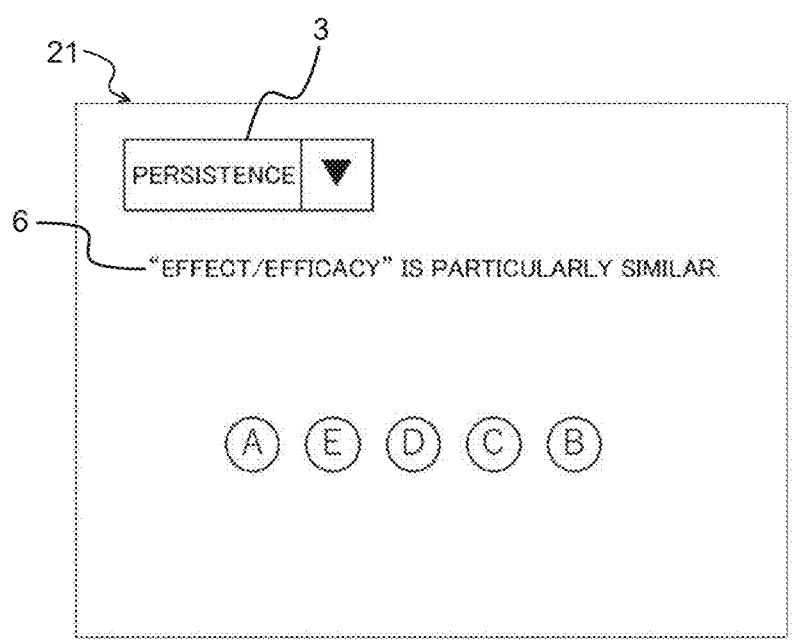
FIG. 11 is a diagram showing an example of a screen displayed on the operation interface unit 21 according to an embodiment of the present technology.

The calculation unit 23 may select recommended fragrance characteristic information according to the similarity. This will be described with reference to FIG. 11. FIG. 11 is a diagram showing an example of a screen displayed on the operation interface unit 21 according to the present embodiment.

As shown in FIG. 11, the operation interface unit 21 displays a message 6 indicating recommended fragrance characteristic information. In the present embodiment, an effect/efficacy, which is one piece of the fragrance characteristic information, is recommended and displayed. When the user selects an effect/efficacy in the list box 3, the operation interface unit 21 rearranges the icons A to E based on the similarity according to the effect/efficacy.

As a result, the user can recognize similarities between fragrances that have not been recognized.

This fragrance characteristic information can be selected by the calculation unit 23.

The calculation unit 23 calculates the similarity between fragrances based on various pieces of fragrance characteristic information. Then, the calculation unit 23 selects fragrance characteristic information in which the similarity between the fragrances associated with the icons A to E displayed on the operation interface unit 21 is high.

3. Third Embodiment of Present Technology
(Example 3 of Fragrance Information Processing System)

Figure 12:
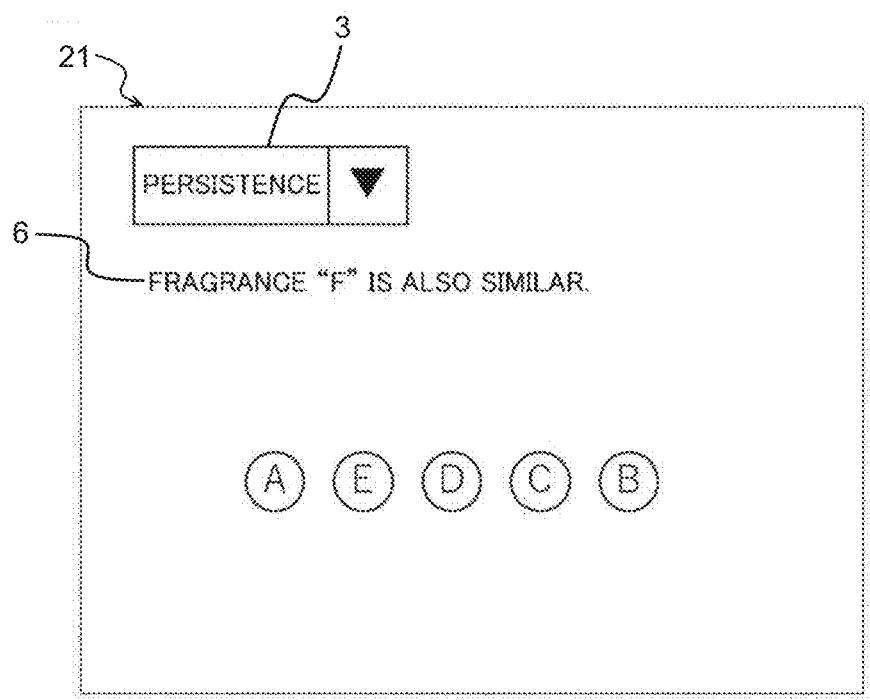
FIG. 12 is a diagram showing an example of a screen displayed on the operation interface unit 21 according to an embodiment of the present technology.

The calculation unit 23 may select recommended fragrance identification information according to the similarity. This will be explained with reference to FIG. 12. FIG. 12 is a diagram showing an example of a screen displayed on the operation interface unit 21 according to the present embodiment.

As shown in FIG. 12, the operation interface unit 21 displays a message 6 indicating recommended fragrance identification information. In the present embodiment, fragrance identification information on fragrance F, which is one of the fragrances, is recommended and displayed. This fragrance F is not displayed as an icon because it is not held in the fragrance holder 11, for example. The icon F is displayed when the user puts the fragrance F in the fragrance holder 11.

As a result, the user can recognize similarities between fragrances that have not been recognized.

This fragrance identification information can be selected by the calculation unit 23. The calculation unit 23 compares the information on the similarity between fragrances held by the storage unit 22 with the icon displayed on the operation interface 21, and selects fragrance identification information which is associated with an icon that is not displayed on the operation interface 21 and which has a high similarity with fragrance identification information associated with an icon being displayed.

4. Fourth Embodiment of Present Technology
(Example 4 of Fragrance Information Processing System)

Figure 13A:
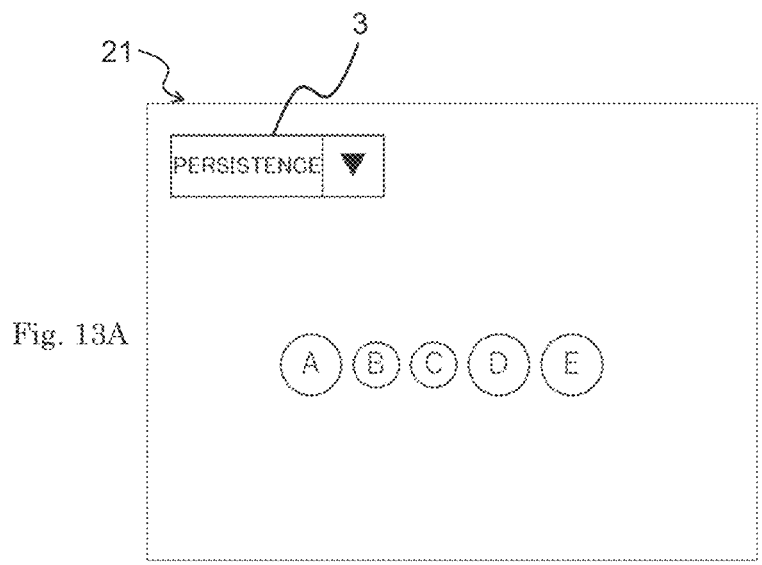
FIGS. 13A and 13B are diagrams showing an example of a screen displayed on the operation interface unit 21 according to an embodiment of the present technology.
Figure 13B:
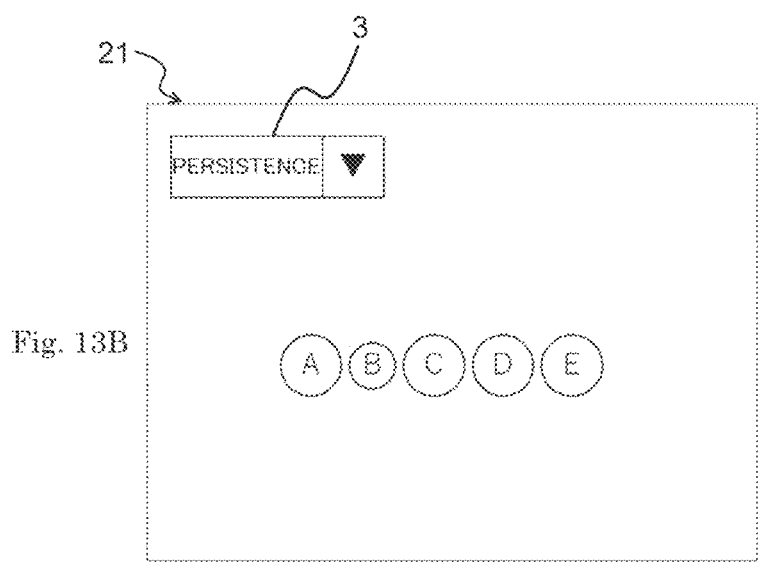

The operation interface unit 21 may change the arrangement of icons over time. This will be described with reference to FIGS. 13A and 13B. FIGS. 13A and 13B are diagrams showing an example of a screen displayed on the operation interface unit 21 according to the present embodiment. FIG. 13A shows the state immediately after the screen is first displayed. FIG. 13B shows a state after elapse of, for example, several seconds from the state shown in FIG. 13A.

As shown in FIG. 13A, immediately after the screen is displayed for the first time, icons related to fragrance A, fragrance E, and fragrance D having the highest similarity are highlighted and displayed. In this way, the user can recognize that the similarity between fragrance A, fragrance E, and fragrance D is the highest.

As shown in FIG. 13B, when several seconds have passed since the state shown in FIG. 13A, the icon related to fragrance C, which has the second highest similarity, is highlighted and displayed. In this way, the user can recognize that the similarity of fragrance C is the next highest.

Note that this highlighting means is not particularly limited. The operation interface unit 21 may change the size of the icon, change the color of the icon, or blink the icon, for example. The storage unit 22 can store information on icons, such as size and color.

The operation interface unit 21 may change the arrangement of the fragrance identification information according to the time period of the day. For example, fragrance identification information on stimulating scents can be arranged in the morning, and fragrance identification information on calming scents can be arranged in the evening.

5. Fifth Embodiment of Present Technology
(Example 5 of Fragrance Information Processing System)

The operation interface unit 21 may change the arrangement of the fragrance identification information according to the user's situation. Specifically, the operation interface unit 21 can change the arrangement of the fragrance identification information based on the user's biometric information and/or context information.

Figure 14:
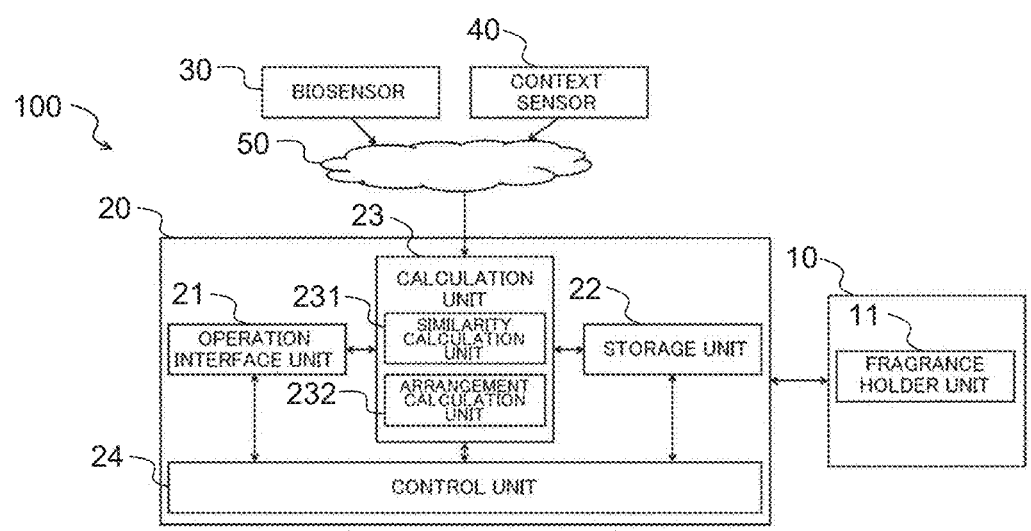
FIG. 14 is a block diagram showing the configuration of the fragrance information processing system 100 according to an embodiment of the present technology.

A configuration of a fragrance information processing system according to an embodiment of the present technology will be described with reference to FIG. 14. FIG. 14 is a block diagram showing the configuration of the fragrance information processing system 100 according to an embodiment of the present technology. As shown in FIG. 14, the fragrance information processing system 100 according to an embodiment of the present technology may further include a biosensor 30 and/or a context sensor 40. The biosensor 30 and/or the context sensor 40 are connected via the information communication network 50.

The biosensor 30 can acquire biometric information on the user. Biometric information includes, for example, heart rate, body temperature, blood pressure, blood oxygen concentration, respiration, water content, blood glucose, electrocardiogram, electroencephalogram, and the like.

The context sensor 40 obtains context information indicating context-related information such as the user's posture and location. Context information includes, for example, whether the user is indoors, outdoors, seeing friends, shopping, walking, running, and the like.

A context sensor can be realized by using, for example, an angular velocity sensor, an acceleration sensor, an inertial sensor (IMU: Inertial Measurement Unit), a GPS (Global Positioning System) positioning unit, a microphone, an ambient light sensor, a schedule management application, or the like. For example, by using an angular velocity sensor, an acceleration sensor, an inertia sensor, or the like, context information such as whether the user is walking or not is obtained. For example, by using a GPS positioning unit, a microphone, an ambient light sensor, or the like, context information such as whether the user is indoors or outdoors is obtained. For example, by using a schedule management application or the like, context information such as whether the user is seeing friends is obtained.

The calculation unit 23 can select fragrance characteristic information as an index based on the biometric information and/or the context information. The operation interface unit 21 arranges icons in an n-dimensional space with the fragrance characteristic information selected by the calculation unit 23 as an index.

In this way, for example, when the user is in an excited state, the operation interface unit 21 can arrange fragrance identification information with a high similarity regarding the sedative effect. For example, when the user is staying in Asia, the operation interface unit 21 can arrange fragrance identification information with a high similarity regarding Asia.

6. Sixth Embodiment of Present Technology
(Example 6 of Fragrance Information Processing System)

Figure 15:
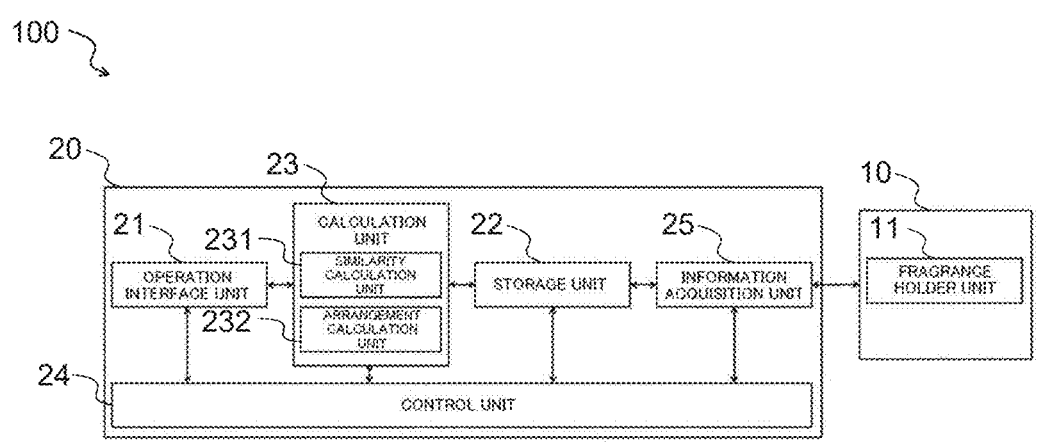
FIG. 15 is a block diagram showing the configuration of the fragrance information processing system 100 according to an embodiment of the present technology.

The fragrance information processing device 20 can acquire information on the fragrance held by the fragrance holder 11. This will be described with reference to FIG. 15. FIG. 15 is a block diagram showing the configuration of the fragrance information processing system 100 according to an embodiment of the present technology. As shown in FIG. 15, the fragrance information processing device 20 can further include an information acquisition unit 25.

The information acquisition unit 25 acquires information on the fragrance held in the fragrance holder 11. Acquisition means is not particularly limited, but for example, the information acquisition unit 25 may read a barcode, two-dimensional code, IC tag, or the like attached to the surface of the fragrance holder 11 to acquire fragrance identification information. The information acquisition unit 25 can acquire information on the fragrance by referring to the database held by the storage unit 22 based on the fragrance identification information.

Alternatively, the information acquisition unit 25 may have a sensor that detects the components of a fragrance. The information acquisition unit 25 may acquire fragrance identification information based on the detected sensing information. The information acquisition unit 25 can acquire information on the fragrance by referring to the database held by the storage unit 22 based on the fragrance identification information.

Alternatively, the information acquisition unit 25 may specify the component contained in the fragrance based on the detected sensing information without referring to the database. In this way, the information acquisition unit 25 can acquire information on fragrances that are not registered in the database, for example. This information can be registered in a database and used by the calculation unit 23.

7. Seventh Embodiment of Present Technology
(Example 7 of Fragrance Information Processing System)

Figure 16:
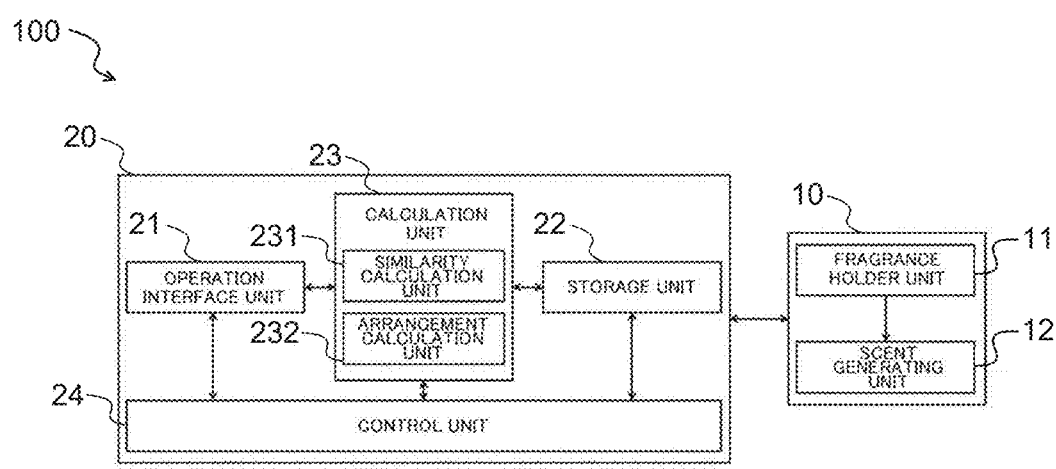
FIG. 16 is a block diagram showing the configuration of the fragrance information processing system 100 according to an embodiment of the present technology.

The scent generating device 10 can further include a scent generating unit that generates scents. This will be explained with reference to FIG. 16. FIG. 16 is a block diagram showing the configuration of the fragrance information processing system 100 according to an embodiment of the present technology. As shown in FIG. 16, the scent generating device 10 can further include a scent generating unit 12 that generates scents. The scent generating device 10 can generate scents by vaporizing the fragrance held in the fragrance holder 11 and emitting it through the scent generating unit 12. For example, the scent generating device 10 vaporizes a liquid fragrance or a wet fragrance, and emits scents through the scent generating unit 12 together with air supplied from an exhaust fan (not shown).

The scent generating device 10 is used as, for example, a device for emitting a scent into a space of a limited range. For example, the scent generating device 10 may be used by users to emit a scent near their face one or more times to relax their mood. In this case, the scent generating device 10 emits a scent with high straightness and hardly diffuses the scent over a wide range, so that the scent is less likely to be sensed by persons around the user. The scent generating device 10 may be portable by the user or stationary.

Figure 17:
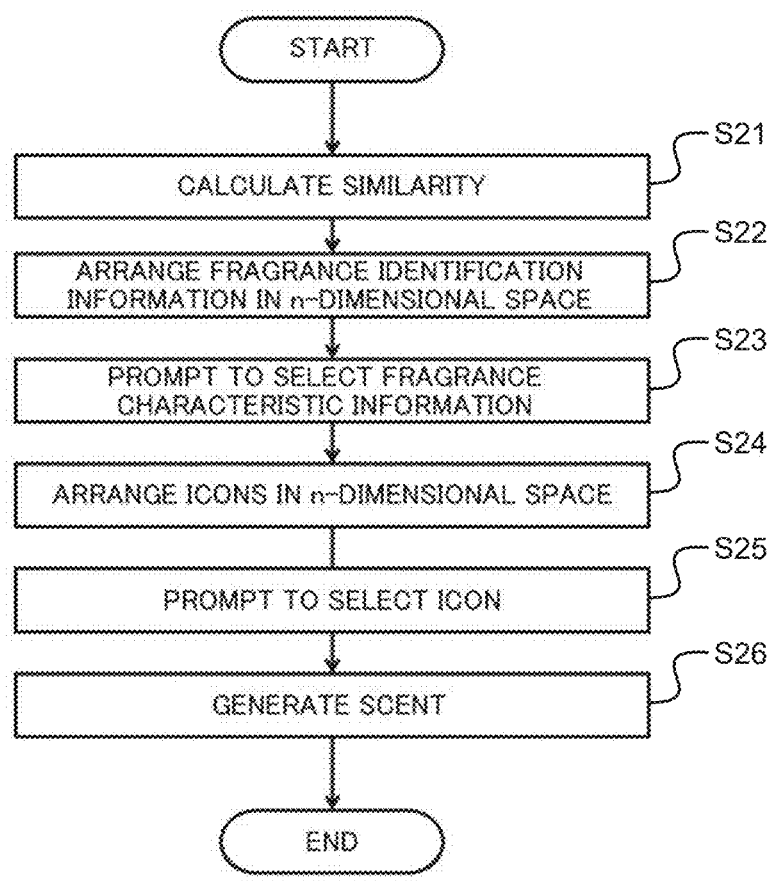
FIG. 17 is a flowchart showing an example of the procedure of the fragrance information processing system 100 according to an embodiment of the present technology.

The processing flow of the fragrance information processing system 100 will be described with reference to FIG. 17. FIG. 17 is a flowchart showing an example of the procedure of the fragrance information processing system 100 according to an embodiment of the present technology.

In FIG. 17, since the contents of steps S21 to S24 are the same as steps S11 to S14 in FIG. 9, the detailed description thereof will be omitted.

In step S25, the operation interface unit 21 prompts the user to select an icon.

In step S26, the scent generating unit 12 selects a fragrance and generates a scent based on the fragrance identification information associated with the selected icon.

8. Eighth Embodiment of Present Technology
(Fragrance Information Processing Device)

Figure 18:
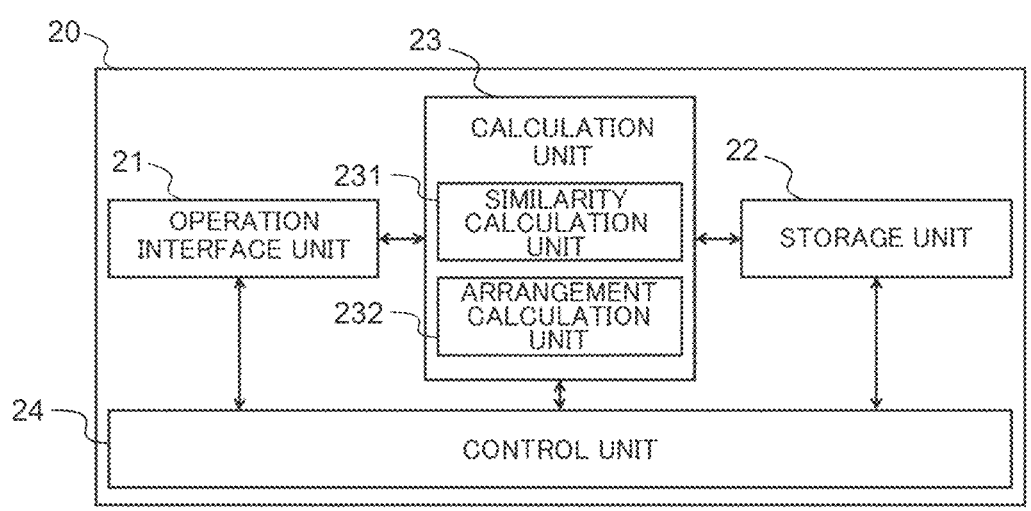
FIG. 18 is a block diagram showing the configuration of the fragrance information processing device 20 according to an embodiment of the present technology.

The configuration of the fragrance information processing device according to the first embodiment of the present technology will be described with reference to FIG. 18. FIG. 18 is a block diagram showing the configuration of the fragrance information processing device 20 according to an embodiment of the present technology.

As shown in FIG. 18, the fragrance information processing device 20 according to an embodiment of the present technology can include, for example, an operation interface unit 21, a storage unit 22, a calculation unit 23, and a control unit 24.

The calculation unit 23 arranges fragrance identification information for identifying fragrances in an n-dimensional space with the fragrance characteristic information as an index, using the similarity between fragrances based on the fragrance characteristic information indicating the characteristics of the fragrances.

The fragrance information processing device 20 may use the technology related to the fragrance information processing system 100 described above. Therefore, descriptions of the operation interface unit 21, the storage unit 22, and the control unit 24 will be omitted.

9. Ninth Embodiment of Present Technology
(Fragrance Information Processing Method)

A fragrance information processing method according to an embodiment of the present technology is a method performed using a computer device.

Figure 19:
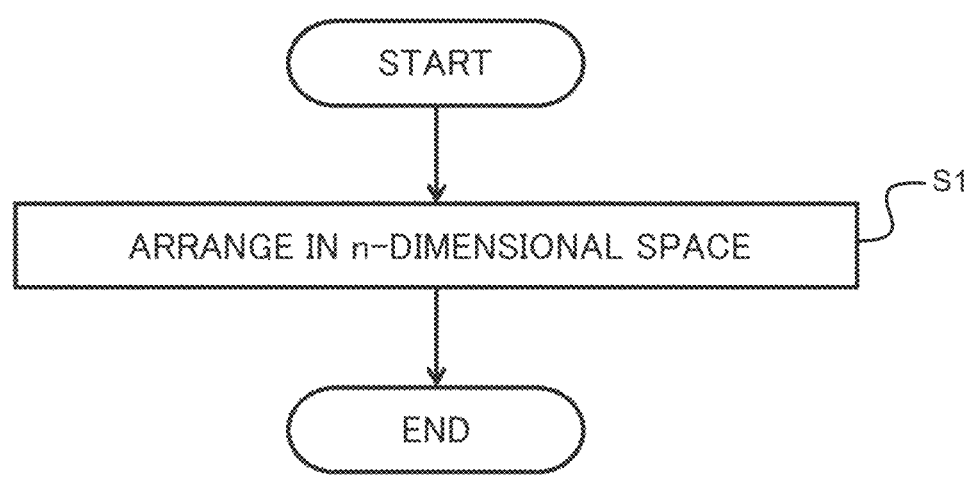
FIG. 19 is a flowchart showing an example of a procedure of a fragrance information processing method according to an embodiment of the present technology.

A procedure of a fragrance information processing method according to an embodiment of the present technology will be described with reference to FIG. 19. FIG. 19 is a flowchart showing an example of the procedure of the fragrance information processing method according to an embodiment of the present technology.

As shown in FIG. 19, the fragrance information processing method according to the present embodiment includes at least allowing the computer device to arrange fragrance identification information for identifying fragrances in an n-dimensional space with fragrance characteristic information indicating the characteristics of the fragrances as an index using the similarity between the fragrances based on the fragrance characteristic information (step S1).

The fragrance information processing method according to the present embodiment may use the technologies according to the other embodiments described above. Therefore, the technology described in the above embodiment will not be described again.

The fragrance information processing method according to the present embodiment can be realized by using software and hardware. Specifically, the fragrance information processing method according to the present embodiment can be realized by the CPU provided in the hardware reading a program for realizing the fragrance information processing method according to the present embodiment, for example.

In addition to this, the configurations described in the above embodiments can be selected or changed as appropriate to other configurations as long as it does not deviate from the gist of the present technology.

The effects described herein are merely illustrative and not limitative, and other effects may be obtained.

The present technology can also have the following configurations.

[1] A fragrance information processing system including:
a computer device that calculates a similarity between fragrances based on fragrance characteristic information indicating characteristics of the fragrances, wherein
the computer device includes at least a calculation unit that arranges fragrance identification information for identifying the fragrances in an n-dimensional space with the fragrance characteristic information as an index using the similarity.

[2] The fragrance information processing system according to [1], wherein the similarity includes a distance in the n-dimensional space.

[3] The fragrance information processing system according to [1] or [2], wherein the similarity includes a correlation in the n-dimensional space.

[4] The fragrance information processing system according to any one of [1] to [3], wherein the calculation unit selects the fragrance characteristic information recommended according to the similarity.

[5] The fragrance information processing system according to any one of [1] to [4], wherein the calculation unit selects the fragrance identification information recommended according to the similarity.

[6] The fragrance information processing system according to any one of [1] to [5], wherein the calculation unit arranges the fragrance identification information in an n-dimensional space with the fragrance characteristic information as an index using operation history information.

[7] The fragrance information processing system according to any one of [1] to [6], further including
an operation interface unit that displays icons associated with the fragrance identification information, wherein
the operation interface unit arranges and displays the icons in an n-dimensional space with the fragrance characteristic information as an index.

[8] The fragrance information processing system according to [7], wherein the operation interface unit prompts a user to select the fragrance characteristic information.

[9] The fragrance information processing system according to [7] or [8], wherein the operation interface unit prompts a user to select a plurality of pieces of the fragrance characteristic information.

[10] The fragrance information processing system according to any one of [7] to [9], wherein the operation interface unit prompts a user to specify a priority of a plurality of pieces of the fragrance characteristic information, and the calculation unit weights each of the plurality of pieces of fragrance characteristic information according to the priority.

[11] The fragrance information processing system according to any one of [7] to [10], wherein the operation interface unit changes arrangement of the icons over time.

[12] The fragrance information processing system according to any one of [7] to [11], wherein the operation interface unit changes arrangement of the icons according to the user's situation.

[13] The fragrance information processing system according to any one of [1] to [12], further including an information acquisition unit, wherein
the information acquisition unit acquires fragrance information from a fragrance holder that holds the fragrance.

[14] The fragrance information processing system according to any one of [1] to [13], further including a scent generating unit, wherein
the scent generating unit generates a scent corresponding to the fragrance identification information selected by the user.

[15] A fragrance information processing device including at least a calculation unit that arranges fragrance identification information for identifying fragrances in an n-dimensional space with fragrance characteristic information indicating characteristics of the fragrances as an index using a similarity between the fragrances based on the fragrance characteristic information.

[16] A fragrance information processing method including at least allowing a computer device to arrange fragrance identification information for identifying fragrances in an n-dimensional space with fragrance characteristic information indicating characteristics of the fragrances as an index using a similarity between the fragrances based on the fragrance characteristic information.

REFERENCE SIGNS LIST

100 Fragrance information processing system
10 Scent generating device
11 Fragrance holder
12 Scent generating unit
20 Fragrance information processing device
21 Operation interface unit
22 Storage unit
23 Calculation unit
231 Similarity calculation unit
232 Arrangement calculation unit
24 Control unit
25 Information acquisition unit
30 Biosensor
40 Context sensor
50 Information communication network
S1 Arranging in n-dimensional space

The invention claimed is:

1. A fragrance information processing system, comprising:
a computer device that includes:
a calculation unit configured to:
determine a similarity between a plurality of fragrances based on a plurality of pieces of fragrance characteristic information associated with the plurality of fragrances, wherein the plurality of pieces of fragrance characteristic information indicates characteristics of the plurality of fragrances;
arrange, based on the determined similarity, a plurality of pieces of fragrance identification information for identification of the plurality of fragrances, wherein the arrangement of the plurality of pieces of fragrance identification information is in a first n-dimensional space with a first piece of fragrance characteristic information of the plurality of pieces of fragrance characteristic information as an index; and
select, based on the determined similarity, a second piece of fragrance characteristic information among the plurality of pieces of fragrance characteristic information; and
an operation interface unit configured to:
arrange a plurality of icons associated with the plurality of pieces of fragrance identification information, wherein the arrangement of the plurality of icons is in a second n-dimensional space with the first piece of fragrance characteristic information as an index; and
display the arranged plurality of icons, and a message that indicates the selected second piece of fragrance characteristic information.

2. The fragrance information processing system according to claim 1, wherein the similarity includes a distance between the plurality of pieces of fragrance identification information in the first n-dimensional space.

3. The fragrance information processing system according to claim 1, wherein the similarity includes a correlation between the plurality of pieces of fragrance identification information in the first n-dimensional space.

4. The fragrance information processing system according to claim 1, wherein the calculation unit is further configured to select, based on the determined similarity, a recommended piece of fragrance identification information of the plurality of pieces of fragrance identification information.

5. The fragrance information processing system according to claim 1, wherein the calculation unit is further configured to arrange, based on operation history information, the plurality of pieces of fragrance identification information.

6. The fragrance information processing system according to claim 1, wherein the operation interface unit is further configured to:
display a list box that includes the plurality of pieces of fragrance characteristic information; and
acquire a user operation associated with the displayed list box, wherein the user operation indicates a selection of the first piece of fragrance characteristic information.

7. The fragrance information processing system according to claim 1, wherein
the operation interface unit is further configured to:
display a set of list boxes, wherein each list box of the set of list boxes includes the plurality of pieces of fragrance characteristic information; and
acquire a set of user operations associated with the set of list boxes, and
the set of user operations indicates a set of selections of a set of pieces of fragrance characteristic information of the plurality of pieces of fragrance characteristic information.

8. The fragrance information processing system according to claim 1, wherein
the operation interface unit is further configured to acquire a user operation that specifies a priority of each piece of fragrance characteristic information of the plurality of pieces of fragrance characteristic information, and
the calculation unit is further configured to determine, based on the specified priority, a weight for the each piece of fragrance characteristic information of the plurality of pieces of fragrance characteristic information.

9. The fragrance information processing system according to claim 1, wherein the operation interface unit is further configured to change the arrangement of the plurality of icons over time.

10. The fragrance information processing system according to claim 1, wherein the operation interface unit is further configured to change, based on a user situation, the arrangement of the plurality of icons.

11. The fragrance information processing system according to claim 1, further comprising:
a fragrance holder configured to hold a fragrance of the plurality of fragrances; and
an information acquisition unit configured to acquire fragrance information from the fragrance holder.

12. The fragrance information processing system according to claim 1, further comprising a scent generating unit, wherein
the operation interface unit is further configured to acquire a user operation that indicates a selection of a piece of fragrance identification information of the plurality of pieces of fragrance identification information, and
the scent generating unit is configured to generate a scent corresponding to the selected piece of fragrance identification information.

13. A fragrance information processing device, comprising:
a calculation unit configured to:
determine a similarity between a plurality of fragrances based on a plurality of pieces of fragrance characteristic information associated with the plurality of fragrances, wherein the plurality of pieces of fragrance characteristic information indicates characteristics of the plurality of fragrances;
arrange, based on the determined similarity, a plurality of pieces of fragrance identification information for identification of the plurality of fragrances, wherein the arrangement of the plurality of pieces of fragrance identification information is in a first n-dimensional space with a first piece of fragrance characteristic information of the plurality of pieces of fragrance characteristic information; and
select, based on the determined similarity, a second piece of fragrance characteristic information among the plurality of pieces of fragrance characteristic information; and
an operation interface unit configured to:
arrange a plurality of icons associated with the plurality of pieces of fragrance identification information, wherein the arrangement of the plurality of icons is in a second n-dimensional space with the first piece of fragrance characteristic information as an index; and
display the arranged plurality of icons, and a message that indicates the selected second piece of fragrance characteristic information.

14. A fragrance information processing method, comprising:
in a computer device that includes a calculation unit and an operation interface unit:
determining, by the calculation unit, a similarity between a plurality of fragrances based on a plurality of pieces of fragrance characteristic information associated with the plurality of fragrances, wherein the plurality of pieces of fragrance characteristic information indicates characteristics of the plurality of fragrances;

arranging, by the calculation unit, a plurality of pieces of fragrance identification information for identification of the plurality of fragrances, wherein
the arrangement of the plurality of pieces of fragrance identification information is in a first n-dimensional space with a first piece of fragrance characteristic information of the plurality of pieces of fragrance characteristic information as an index, and
the arrangement of the plurality of pieces of fragrance identification information is based on the determined similarity;

selecting, by the calculation unit, a second piece of fragrance characteristic information among the plurality of pieces of fragrance characteristic information based on the determined similarity;

arranging, by the operation interface unit, a plurality of icons associated with the plurality of pieces of fragrance identification information, wherein the arrangement of the plurality of icons is in a second n-dimensional space with the first piece of fragrance characteristic information as an index; and displaying, by the operation interface unit, the arranged plurality of icons, and a message that indicates the selected second piece of fragrance characteristic information.

* * * * *